United States Patent
Ellis

(10) Patent No.: US 8,577,570 B2
(45) Date of Patent: Nov. 5, 2013

(54) TOUCH POINT CALIBRATION METHOD FOR A MOTOR VEHICLE

(75) Inventor: Nathaniel Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 722 days.

(21) Appl. No.: 12/425,521

(22) Filed: Apr. 17, 2009

(65) Prior Publication Data

US 2010/0268428 A1     Oct. 21, 2010

(51) Int. Cl.
- *G06F 7/00* (2006.01)
- *G06F 17/00* (2006.01)
- *G06F 19/00* (2011.01)

(52) U.S. Cl.
USPC .............................................. 701/67; 701/68

(58) Field of Classification Search
USPC ....................................... 701/67, 68
See application file for complete search history.

(56) References Cited

U.S. PATENT DOCUMENTS

| | | |
|---|---|---|
| 5,014,832 A | 5/1991 | Satoh et al. |
| 5,337,874 A * | 8/1994 | Oltean et al. ............. 192/70.252 |
| 5,390,497 A | 2/1995 | Cottam |
| 5,624,350 A * | 4/1997 | Bates ............................... 477/78 |
| 5,676,229 A | 10/1997 | Bates |
| 5,737,979 A | 4/1998 | McKenzie et al. |
| 5,993,355 A | 11/1999 | Nordgard |
| 6,022,295 A | 2/2000 | Liu |
| 6,023,988 A | 2/2000 | McKee et al. |
| 6,050,379 A | 4/2000 | Lyon |
| 6,086,514 A | 7/2000 | Jones et al. |
| 6,494,810 B1 | 12/2002 | Mack et al. |
| 6,553,857 B2 | 4/2003 | Sporl |
| 6,641,504 B2 | 11/2003 | Genise et al. |
| 6,658,951 B2 | 12/2003 | Harries |
| 6,711,486 B1 | 3/2004 | Karlsson et al. |
| 6,840,890 B2 | 1/2005 | Mack et al. |
| 2002/0086769 A1 * | 7/2002 | Hemmingsen et al. ......... 477/79 |
| 2002/0137597 A1 * | 9/2002 | Genise et al. .................. 477/107 |
| 2004/0044293 A1 * | 3/2004 | Burton .......................... 600/544 |
| 2006/0185459 A1 * | 8/2006 | Matsumura et al. ............ 74/335 |
| 2009/0037073 A1 * | 2/2009 | Jung et al. ..................... 701/101 |
| 2009/0076695 A1 * | 3/2009 | Panzer ............................ 701/68 |
| 2010/0056336 A1 * | 3/2010 | Zdych et al. .................. 477/179 |

* cited by examiner

*Primary Examiner* — Jeffrey Shapiro

(74) *Attorney, Agent, or Firm* — Plumsea Law Group, LLC

(57) ABSTRACT

A touch point calibration method for a motor vehicle is disclosed. The method includes steps for determining if the touch point can be calibrated. The method also includes steps for determining the touch point when the system can be calibrated.

20 Claims, 8 Drawing Sheets

TOUCH POINT CALIBRATION METHOD FOR A MOTOR VEHICLE

BACKGROUND

The present invention relates to motor vehicles and in particular to a touch point calibration method for a motor vehicle.

Methods for determining the touch point of a clutch in a motor vehicle have been previously proposed. However, the previous methods have been directed to determining the touch point in automatic transmissions or manual transmissions that are automatically controlled using an actuator. There is a need in the art for a method that determines a touch point of a clutch in a manual transmission that is manually controlled.

SUMMARY

The invention discloses a touch point calibration method for a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a motor vehicle, comprising the steps of: receiving information related to a clutch position from a clutch sensor; determining a clutch velocity according to the information related to the clutch position; comparing the clutch velocity with a predetermined maximum clutch velocity; allowing a calibration mode when the clutch velocity is below the predetermined maximum clutch velocity, the calibration mode being used to determine a touch point value for a clutch; preventing the calibration mode when the clutch velocity is greater than the predetermined maximum clutch velocity; and operating the motor vehicle using the touch point value.

In another aspect, the invention provides a method of calibrating a motor vehicle, comprising the steps of: receiving information related to a clutch position from a clutch sensor; determining an engine speed according to information received from an engine speed sensor and determining a mainshaft speed of a transmission according to information received from a mainshaft speed sensor; calculating a speed difference value using the mainshaft speed and the engine speed; determining a touch point value using the clutch position and the speed difference value; and operating the motor vehicle according to the touch point value.

In another aspect, the invention provides a method of calibrating a motor vehicle, comprising the steps of: receiving information related to operating parameters of the motor vehicle; receiving information related to a clutch position from a clutch sensor; determining an engine speed according to information received from an engine speed sensor and determining a mainshaft speed of a transmission according to information received from a mainshaft speed sensor; calculating a speed difference value using the engine speed and the mainshaft speed; checking if a motor vehicle is operating in a calibration mode; and determining a touch point value using the clutch position and the speed difference value when the motor vehicle is operating in the calibration mode.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
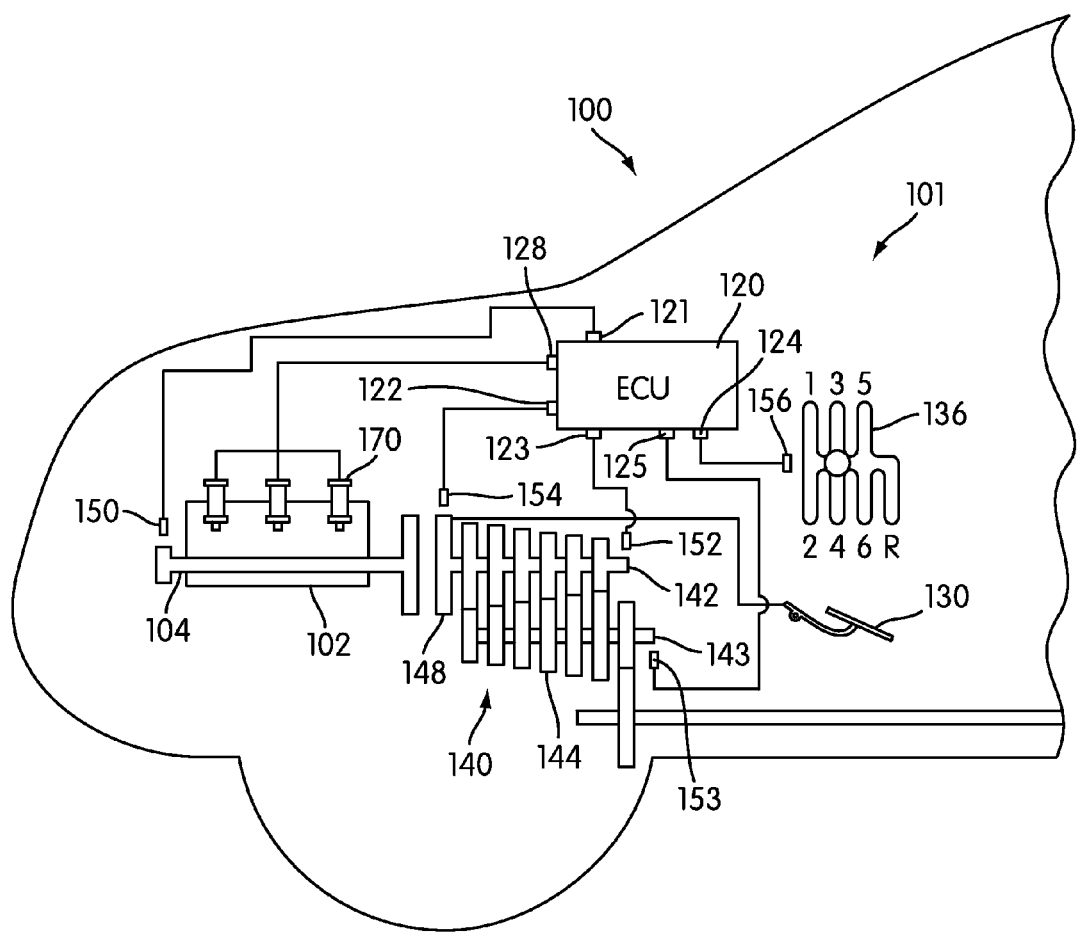
FIG. 1 is a schematic view of an embodiment of a motor vehicle including a touch point calibration system.

FIG. 1 is a schematic diagram of a preferred embodiment of a portion of motor vehicle 100. For purposes of illustration, motor vehicle 100 is shown as a sports utility vehicle; however it should be understood that in other embodiments motor vehicle 100 could be any type of motor vehicle including, but not limited to: cars, trucks, vans, minivans, SUV's, motorcycles, scooters, boats, personal watercraft, and aircraft.

Motor vehicle 100 can include touch point calibration system 101. The term "touch point calibration system" refers to one or more components of a motor vehicle that may be utilized to determine the touch point of one or more clutches of a motor vehicle. For purposes of clarity, only components related to touch point calibration system 101 are illustrated and discussed in the current embodiment. However, it will be understood that in other embodiments, motor vehicle 100 may include additional components and/or systems. In addition, in other embodiments, some of the components shown for touch point calibration system 101 may be optional.

Motor vehicle 100 may include engine 102. Engine 102 may be any type of engine that is capable of producing torque. In addition, motor vehicle 100 and engine 102 may be associated with other components that can assist in propelling motor vehicle 100. In the current embodiment, engine 102 is schematically illustrated. It should be understood that in different embodiments, the number of cylinders utilized in engine 102 may vary.

Engine 102 may be associated with transmission 140 that is configured to transfer power between engine 102 and one or more wheels of motor vehicle 100. Generally, transmission 140 can be any type of transmission. In an exemplary embodiment, transmission 140 is a manual transmission. In particular, transmission 140 can include mainshaft 142 and output shaft 143. Mainshaft 142 may be configured to receive torque from, or transmit torque to, engine shaft 104 of engine 102. In some cases, engine shaft 104 may be a crankshaft. In other cases, however, engine shaft 104 can be connected directly to a crankshaft of engine 102. Furthermore, output shaft 143 may be configured to receive torque from, or transmit torque to, a driveshaft.

For purposes of clarity, transmission 140 is illustrated schematically in the current embodiment. Generally, transmission 140 may include gear set 144 associated with mainshaft 142 and output shaft 143. In different embodiments, the number, arrangement, sizes, and types of gears comprising gear set 144 may vary. It will be understood that any known arrangement for gears in a manual transmission could be used. In addition, in other embodiments a transmission can include additional shafts that include gears and help transfer torque between mainshaft 142 and output shaft 143.

Transmission 140 can also include clutch 148 that is configured for engaging and disengaging engine shaft 104 and mainshaft 142. Generally, clutch 148 can be any type of device configured to engage and disengage engine shaft 104 and mainshaft 142. Examples of different types of clutches that can be used include, but are not limited to: single plate friction clutches, multiple plate friction clutches, dry clutches, wet clutches, dog clutches, cone clutches, overrunning clutches, centrifugal clutches, hydraulic clutches and electromagnetic clutches, as well as any other types of clutches. For purposes of illustration, clutch 148 is shown schematically in the current embodiment as a single plate friction clutch.

In embodiments with a manual transmission, a motor vehicle can include a clutch pedal that is configured to operate the clutch. In an exemplary embodiment, motor vehicle 100 can include clutch pedal 130. Generally, clutch pedal 130 can be any type of pedal configured to operate clutch 148. In one embodiment, clutch pedal 130 can be configured to apply hydraulic pressure to clutch 148 to engage and disengage clutch 148. In another embodiment, clutch pedal 130 can be configured to deliver an electric signal to clutch 148. In still another embodiment, clutch pedal 130 can be configured to control clutch 148 in another manner.

In embodiments with a manual transmission, a motor vehicle can include a shifting device for changing the gear of the manual transmission. In an exemplary embodiment, motor vehicle 100 can include shifting device 136. Generally, shifting device 136 can be any type of gear shifting device. In particular, shifting device 136 can include a shifting stick and a set of positions for the shifting stick that correspond to the various gear ratios of transmission 140. For purposes of clarity, the current embodiment illustrates a shifting device including six distinct gear ratios and a reverse gear. However, in other embodiments a shifting device can have a position for any number of gear ratios that can be utilized with the transmission.

Engine 102 may be associated with one or more fuel injectors that are configured to deliver fuel to engine 102. In this embodiment, engine 102 preferably includes fuel injector set 170 that comprises three fuel injectors. In other embodiments, more or less than three fuel injectors may be associated with engine 102. Each fuel injector comprising fuel injector set 170 may be associated with, and configured to deliver fuel to, a cylinder within engine 102. Although only three fuel injectors are illustrated in the current embodiment, it will be understood that an engine may include at least one fuel injector for each cylinder. In other words, the number of fuel injectors in an embodiment may vary according to the number of cylinders in the engine.

Motor vehicle 100 can include one or more sensors configured to receive information related to operating conditions of motor vehicle 100. In some embodiments, motor vehicle 100 can include engine speed sensor 150. Generally, engine speed sensor 150 can be any type of sensor configured to measure the speed of engine 102. In some cases, engine speed sensor 150 can be a crankshaft sensor. In addition, engine speed sensor 150 could be associated with any portion of an engine including, but not limited to: the main crank pulley, the flywheel, the crankshaft, as well as any other location.

In some embodiments, motor vehicle 100 can include mainshaft speed sensor 152 for receiving information related to the speed of mainshaft 142 of transmission 140. Generally, mainshaft speed sensor 152 can be any type of sensor configured to measure the speed of mainshaft 142. In addition, in some embodiments, motor vehicle 100 can include output shaft speed sensor 153 for determining the speed of output shaft 143 of transmission 140.

In some embodiments, motor vehicle 100 can include clutch sensor 154. In some cases, clutch sensor 154 can be a clutch position sensor that is configured to output information related to the position of clutch 148. Generally, clutch sensor 154 can be associated with clutch 148 in any manner. In some cases, clutch sensor 154 can be configured to determine the position of a clutch plate of clutch 148. In embodiments utilizing a clutch slave cylinder for applying force to clutch 148, clutch sensor 154 can be configured to determine the position of the clutch slave cylinder. In still other embodiments, clutch sensor 154 can be configured to determine the position of any component associated with the operation of clutch 148, which also moves as clutch 148 changes between a disengaged and engaged position. For example, in still another embodiment, clutch sensor 154 could be configured to monitor the position of clutch pedal 130.

Motor vehicle 100 can include neutral switch sensor 156. Generally, neutral switch sensor 156 can be any type of sensor used to determine if transmission 140 is operating in a neutral mode. In some cases, neutral switch sensor 156 can be associated with transmission 140. In an exemplary embodiment, neutral switch sensor 156 can be associated with shifting device 136.

In different embodiments, different types of neutral switch sensors can be used. In some embodiments, a neutral switch sensor can be configured to indicate a neutral switch state change following full synchronization of gears in a transmission. In other words, the neutral switch sensor does not indicate a neutral switch state change until the synchronizers have finished facilitating full meshing of the gears. In other embodiments, however, a neutral switch sensor could be used that indicates a neutral switch state change while the synchronizers are working to fully mesh the gears. It will be understood that by varying the type of neutral switch sensor as well as the location of the neutral switch sensor within the transmission, the operating conditions in which a neutral switch sensor may indicate a neutral switch state change may be varied.

Motor vehicle 100 may include provisions for communicating, and in some cases controlling, the various components associated with motor vehicle 100. In some embodiments, motor vehicle 100 may be associated with a computer or similar device. In the current embodiment, motor vehicle 100 may be associated with electronic control unit 120, hereby referred to as ECU 120. In one embodiment, ECU 120 may be configured to communicate with, and/or control, engine 102 as well as additional components of motor vehicle 100 not associated with engine 102.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include fuel injector port 128 for communicating with fuel injector set 170. In particular, ECU 120 can send information to fuel injector set 170 for controlling fuel injection parameters, such as fuel injection timing and fuel injection amount. In addition, ECU 120 can be configured to cut fuel to one or more cylinders of engine 102 by controlling one or more fuel injectors of fuel injector set 170. With this arrangement, ECU 120 can control the operation of engine 102 by controlling the timing and quantity of fuel provided to each cylinder of engine 102.

In some cases, for example, ECU 120 can operate engine 102 between an active fuel mode and a fuel cut mode. The term "active fuel mode" as used throughout this detailed description and in the claims refers to a mode of the engine in which fuel is delivered to each cylinder. The term "fuel cut mode" as used throughout this detailed description and in the claims refers to a mode of the engine in which no fuel is delivered to one or more cylinders of the engine. For example, fuel cut mode can be utilized when a vehicle is traveling down a hill and power is directed from the wheels to the engine. By cutting fuel to one or more cylinders, the fuel economy of a motor vehicle can be increased.

In some embodiments, ECU 120 can include provisions for transmitting and/or receiving information from one or more sensors. In one embodiment, ECU 120 can include first sensor port 121 configured to communicate with engine speed sensor 150. Using first sensor port 121, ECU 120 may be configured to receive engine speed information from engine speed sensor 150. ECU 120 can also include second sensor port 122, third sensor port 123, fourth sensor port 124 and fifth sensor portion 125 configured to communicate with clutch sensor 154, mainshaft speed sensor 152, neutral switch sensor 156 and output shaft speed sensor 153, respectively. With this arrangement, ECU 120 can receive information related to one or more operating conditions of a motor vehicle.

Figure 2:
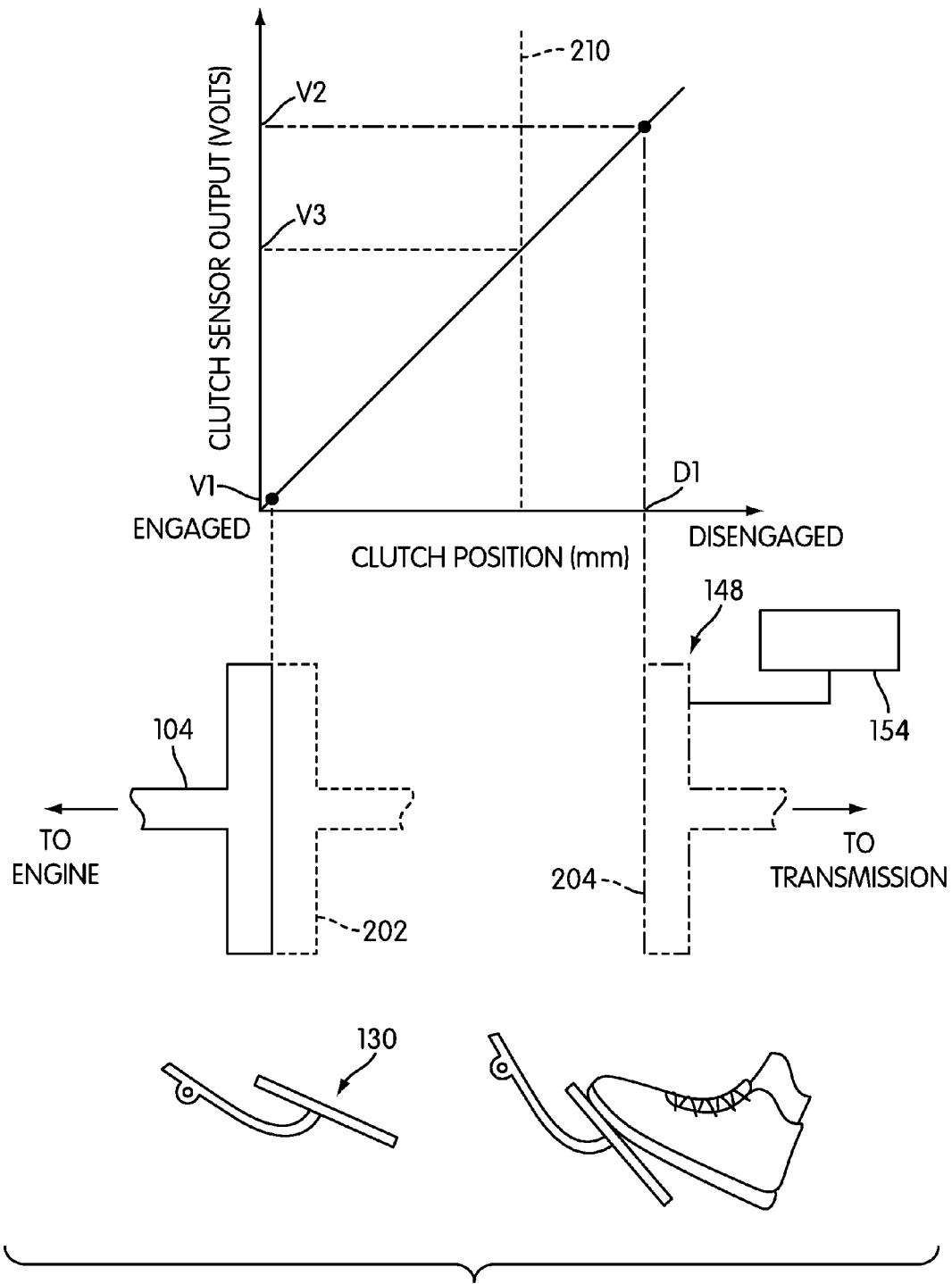
FIG. 2 is a schematic view of an embodiment of a relationship between a clutch sensor and the position of the clutch.

FIG. 2 illustrates a schematic embodiment of the operation of clutch sensor 154. In this embodiment, clutch sensor 154 is schematically shown as connected to a clutch plate of clutch 148. However, as previously discussed, clutch sensor 154 can be configured to determine the position of any component of a clutch, including, for example, the clutch slave cylinder which is used to actuate the clutch in some embodiments.

Referring to FIG. 2, clutch sensor 154 is configured to output a signal that is proportional to the position of clutch 148. For example, with clutch pedal 130 in a non-depressed condition, clutch 148 may be disposed in fully engaged position 202. In other words, clutch 148 is fully engaged with engine shaft 104. At this point, clutch sensor 154 outputs voltage V1. As clutch pedal 130 is fully depressed, clutch 148 is translated a distance D1 away from engine shaft 104. In other words, clutch 148 is moved to fully disengaged position 204. At this point, clutch sensor 154 outputs voltage V2. Furthermore, each intermediate position of clutch 148 between the fully engaged and fully disengaged position is associated with a particular output voltage from clutch sensor 154. In an exemplary embodiment, the relationship between the position of clutch 148 and the output voltage of clutch sensor 154 is approximately linear. With this arrangement, ECU 120 may determine the position of clutch 148 according to the voltage received from clutch sensor 154. It will be understood that although the current embodiment utilizes voltage as an output signal for clutch sensor 154, in other embodiments any other type of output signal could be used.

As previously discussed, there is a position of the clutch between the fully engaged position and the fully disengaged position that serves as a boundary for significant torque transfer, known as the touch point. The touch point indicates the position of the clutch at which significant torque transfer begins, as the clutch moves from a fully disengaged position to a fully engaged position. Likewise, the touch point indicates the position of the clutch at which significant torque transfer ends, as the clutch moves from a fully engaged position to a fully disengaged position.

In the current embodiment, touch point boundary 210 indicates the position of clutch 148 at which the touch point occurs. In other words, as clutch 148 moves from fully disengaged position 204 towards fully engaged position 202, touch point boundary 210 indicates the position at which significant amounts of torque are first transferred between the transmission and the engine. Likewise, as clutch 148 moves from fully engaged position 202 towards fully disengaged position 204, touch point boundary 210 indicates the position beyond which there is no longer any significant torque transferred between the engine and the transmission.

Using the exemplary relationship between clutch position and clutch sensor output illustrated in FIG. 2, ECU 120 may be configured to associate the touch point of clutch 148 with a predetermined voltage signal from clutch sensor 154. In this illustrative embodiment, the touch point of clutch 148 is a position of the clutch at which voltage V3 is output by clutch sensor 154.

For purposes of clarity, the remainder of this detailed discussion may refer to a clutch position without regards to particular voltage signal received from a clutch sensor. In other words, it will be understood that where the term clutch position is applied, the clutch position is determined by first receiving a particular signal from the clutch sensor and then associating that signal with a clutch position. It will also be understood that other sensors discussed in this detailed description may be configured to output one or more signals that are received by an ECU. These output signals can also be associated with particular measured parameters. For example, an engine speed sensor can output a signal, such as a voltage signal, that may be used to determine a particular engine speed according to a known relationship between the output signal and the engine speed.

Typically, in a motor vehicle with a manual transmission, determining the touch point of a clutch is not necessary, since the clutch is operated manually by a driver. However, in embodiments employing technology configured to automatically modify the classic drivability of a manual transmission, it may be necessary to automatically determine the touch point. While an initial touch point setting may be determined during manufacturing, such as the touch point setting illustrated in FIG. 2, the touch point setting may require calibration according to various environmental parameters (such as temperature and moisture), driving conditions, as well as other parameters that may contribute to slight variations in a touch point for a clutch.

A motor vehicle can include provisions for automatically calibrating the touch point of a clutch associated with a manual transmission. In particular, as a clutch pedal in a manual transmission is operated by a driver rather than automatically controlled, a motor vehicle can include provisions for determining when a calibration can be made. In addition, a motor vehicle can include provisions for performing the calibration when it is determined that the calibration can be made.

FIGS. 3 through 6 illustrate an exemplary embodiment of a touch point calibration method. Generally, motor vehicle 100 may be configured to operate between a normal mode, in which no touch point calibration is taking place, and a calibration mode, in which a touch point calibration is performed. In some embodiments, ECU 120 may receive information from one or more vehicle systems to determine if motor vehicle 100 is in a normal mode or a calibration mode. Once it is determined that motor vehicle 100 is in a calibration mode, ECU 120 can receive information from one or more vehicle systems to determine a touch point calibration value.

Figure 3:
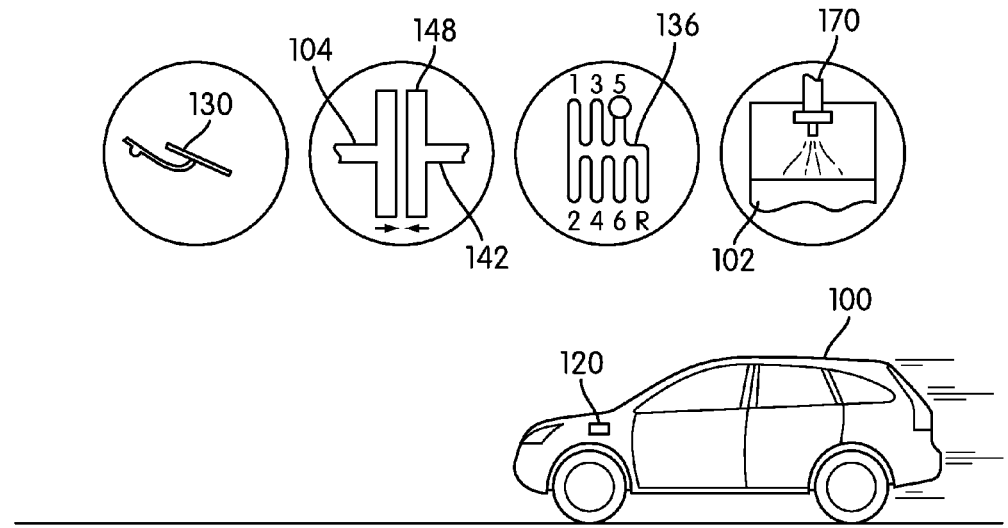
FIG. 3 is a schematic view of an embodiment of a motor vehicle operating in a normal mode.

Referring to FIG. 3, motor vehicle 100 is operating in a normal mode. In particular, clutch pedal 130 is in a non-depressed, or fully raised, position. Likewise, clutch 148 is fully engaged to provide maximum torque transfer between engine shaft 104 of engine 102 and mainshaft 142 of transmission 140. In addition, shifting device 136 is in a non-neutral gear and fuel injector set 170 is operating to deliver fuel to engine 102.

Figure 4:
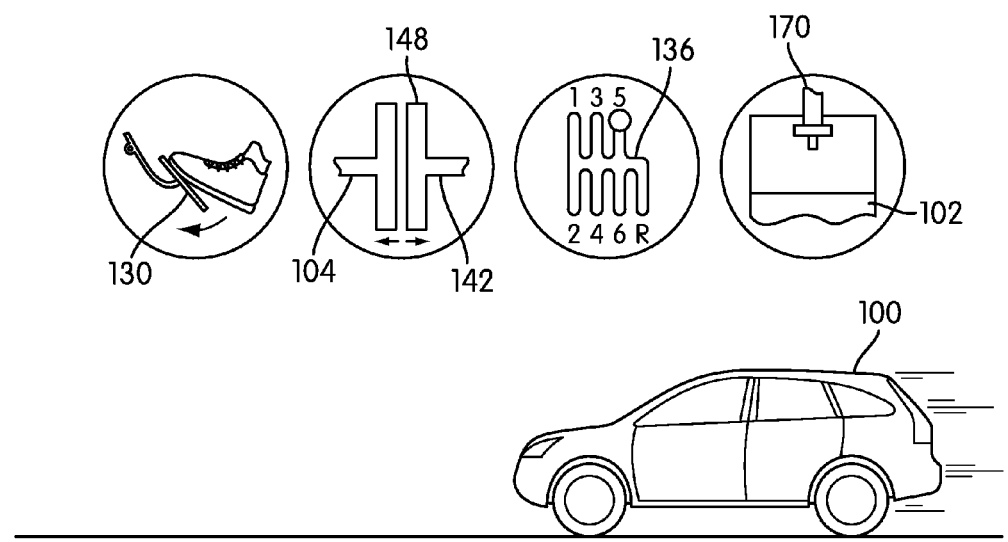
FIG. 4 is a schematic view of an embodiment of a motor vehicle operating in a calibration mode.

Referring now to FIG. 4, clutch pedal 130 is depressed. As clutch pedal 130 is depressed, clutch 148 moves towards a disengaged position. At this point, motor vehicle 100 transitions from a normal mode to a calibration mode. While operating in a calibration mode, ECU 120 can be configured to monitor one or more engine parameters to determine when clutch 148 has moved to a position corresponding to the touch point. In an exemplary embodiment, ECU 120 may measure changes in the speeds of engine shaft 104 and mainshaft 142 to determine the point at which significant torque transfer has stopped.

In order to accurately determine a touch point value for clutch 148, additional operating conditions must be maintained for motor vehicle 100 to remain in calibration mode. In the current embodiment, fuel cut is activated. In particular, fuel injector set 170 is deactivated to stop fuel delivery to engine 102. This arrangement can help to minimize variations in torque provided by engine 102 while the touch point is being determined. In addition, shifting device 136 is maintained in a non-neutral gear, to reduce variations in torque between mainshaft 142 and output shaft 143 (see FIG. 1) during touch point calibration. With this arrangement, a touch point value can be determined more accurately since changes in torque between engine shaft 104 and mainshaft 142 will be substantially determined by changes in the clutch position.

In some embodiments, additional parameters can also be monitored to determine if a touch point calibration can be performed. For example, in some embodiments the speed at which a clutch is disengaged can affect the validity of a touch point calibration measurement. In some cases, if the clutch is disengaged too quickly, the relationship between the clutch position and the voltage output by a clutch sensor may be non-linear, in contrast to the relationship illustrated in FIG. 2. Therefore, a touch point calibration method can include provisions to ensure that the touch point value is not calibrated when the clutch speed is too high.

Figure 5:
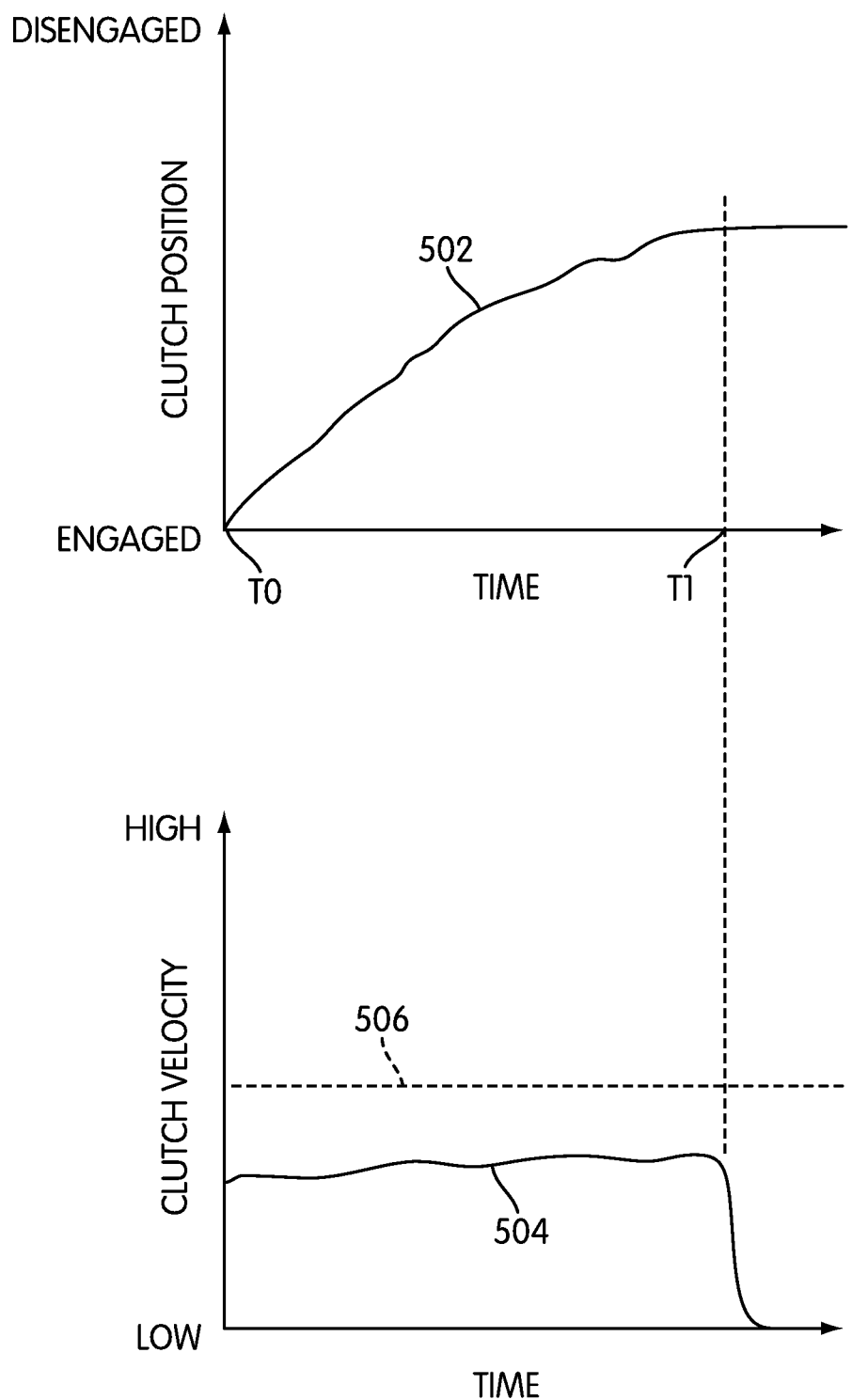
FIG. 5 is a schematic view of an embodiment of a relationship between clutch position and clutch velocity as a function of time.

FIG. 5 illustrates an exemplary embodiment of measured clutch position 502 with respect to time. In this embodiment, between time T0 and time T1, the change in the clutch position is approximately constant. In addition, after time T1, the clutch position remains approximately fixed. Therefore, clutch velocity 504 is computed to be approximately constant between time T0 and T1. Furthermore, clutch velocity 504 drops to approximately 0 after time T1.

In order to prevent inaccurate readings for a touch point value, some embodiments can include a predetermined maximum clutch velocity which serves as a threshold for the clutch velocity. The predetermined maximum clutch velocity can be a parameter that is determined during manufacturing of a motor vehicle. In this embodiment, the threshold is indicated at predetermined maximum clutch velocity 506. In this case, clutch velocity 504 never rises above predetermined maximum clutch velocity 506. In other words, motor vehicle 100 may operate in a calibration mode throughout the time period between time T0 and time T1. By utilizing a threshold value for the clutch velocity, an ECU may exit a calibration mode whenever the clutch velocity exceeds the predetermined maximum clutch velocity to help prevent inaccurate measurements for a clutch position.

In addition, in some embodiments, an ECU can be configured to monitor a vehicle speed to determine if the vehicle speed is above a predetermined vehicle speed as well as if the vehicle speed is changing too quickly. For example, in cases where a driver may apply heavy braking, the vehicle speed may decrease rapidly as the engine speed decreases rapidly. Furthermore, as the vehicle speed decreases, the mainshaft speed may also decrease at a similar rate, since the mainshaft of the transmission is being driven by the wheels in this situation. This simultaneous decrease in both the engine speed and the mainshaft speed can result in small variations between the mainshaft speed and the engine speed, which can increase the inaccuracy of a touch point value measurement.

In an exemplary embodiment, ECU 120 can determine a vehicle speed using information received from output shaft speed sensor 153. In particular, the vehicle speed can be determined using the output shaft speed as well as information about the current gear of the transmission. In other embodiments, however, the vehicle speed can be determined in any other manner known in the art for determining vehicle speed. Furthermore, ECU 120 can exit a calibration mode when the vehicle speed is below a predetermined vehicle speed and/or in situations where the vehicle speed is changing too rapidly.

A touch point calibration system can include provisions for determining a new calibrated touch point value whenever the motor vehicle is operating in a calibration mode. In some cases, a touch point calibration system can be configured to monitor and store a temporary clutch position. In addition, the touch point calibration system can be configured to select a stored value of the temporary clutch position to be used as the touch point value according to a measured operating parameter.

Figure 6:
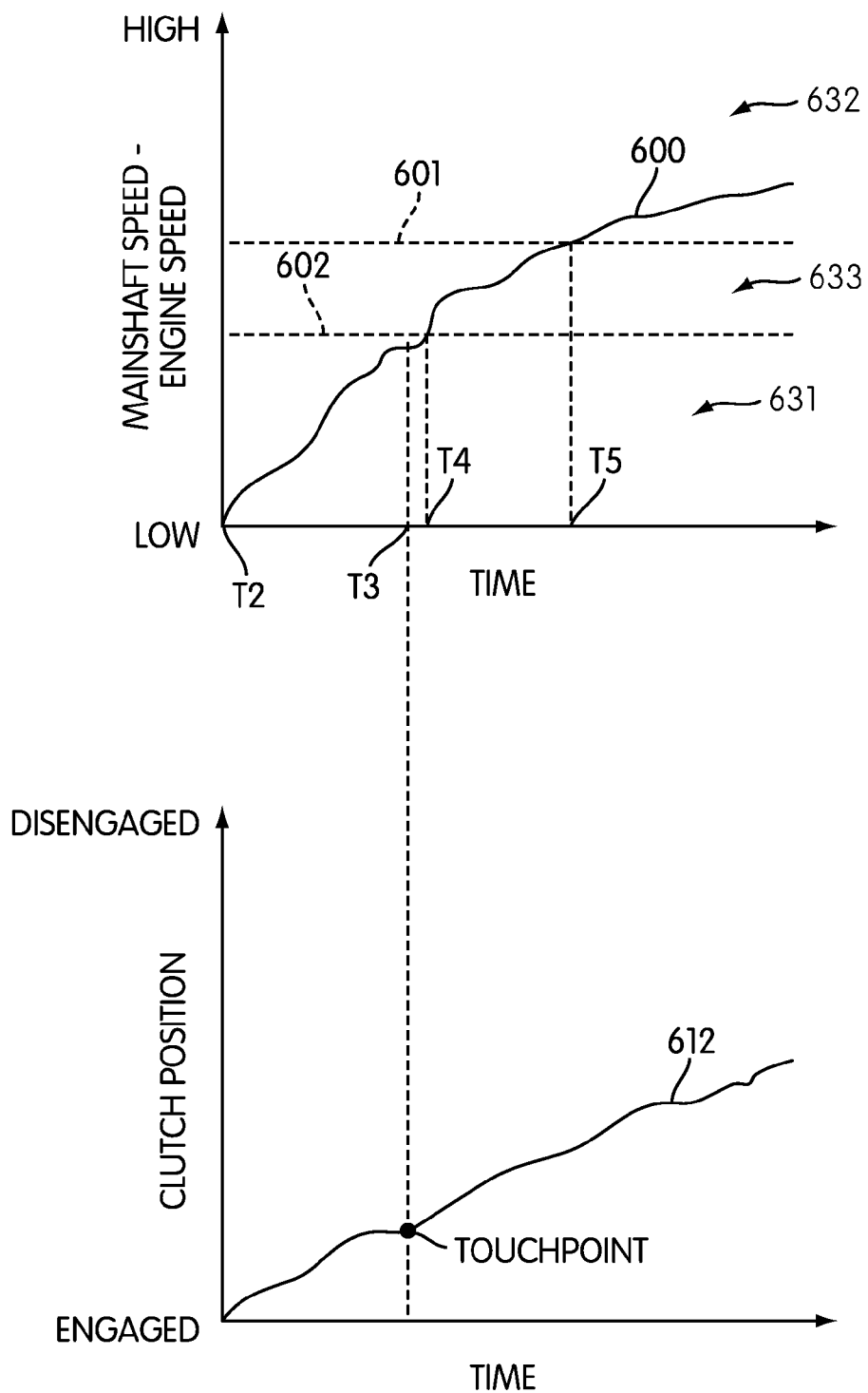
FIG. 6 is a schematic view of an embodiment of a relationship of the difference in engine speed and mainshaft speed as a function of time and of a relationship of the clutch position as a function of time.

FIG. 6 illustrates an exemplary embodiment of a method for determining a touch point calibration value when a vehicle is operating a calibration mode. Referring to FIG. 6, the difference between the mainshaft speed of the transmission and the engine speed, hereby referred to as the speed difference value, is shown as a function of time. In other words, the speed difference value is equal to the mainshaft speed minus the engine speed. In this embodiment, measured speed difference value 600 is shown as a function of time. In addition, clutch position 612 is shown as a function of time. It will be understood from the preceding discussion that in the exemplary embodiment the clutch position is really a parameter determined by measuring the output voltage of a clutch position sensor.

In this exemplary embodiment, at time T2, the clutch is in a fully engaged position. Following time T2, the clutch moves towards a disengaged position. In this case, measured speed difference value 600 is positive and the magnitude of measured speed difference value 600 increases with time. This may occur, for example, if a vehicle is coasting, since as the clutch is depressed the engine speed will fall while the mainshaft speed remains substantially constant.

In some cases, ECU 120 may compare measured speed difference value 600 with one or more predetermined values. In the current embodiment, for example, ECU 120 may compare measured speed difference value 600 with first predetermined value 601 and second predetermined value 602. In this case, first predetermined value 601 may be a data setting that is associated with a fully disengaged setting of the clutch. In other words, when measured speed difference value 600 is greater than predetermined value 601, ECU 120 assumes that the clutch has been fully disengaged. In addition, second predetermined value 602 may be a data setting that allows for some error in determining the speed difference value. For example, in one embodiment, differences in the mainshaft speed and engine speed that are less than second predetermined value 602 may be due to clutch slippage or errors in calculating engine or mainshaft speeds, while differences in the mainshaft speed and engine speed that are greater than second predetermined value 602 may be due to actual clutch disengagement.

Referring to the current embodiment illustrated in FIG. 6, first predetermined value 601 and second predetermined value 602 may divide the set of possible speed difference values into three distinct ranges. In particular, first range 631 may be the set of all speed difference values less than second predetermined value 602. In addition, second range 632 may be the set of all speed difference values greater than first predetermined value 601. Still further, third range 633 may be the set of speed difference values between first predetermined value 601 and second predetermined value 602. In some cases, third range 633 may include both first predetermined value 601 and second predetermined value 602.

In different embodiments, one or more predetermined values can vary. In some embodiments, first predetermined value 601 may be greater than second predetermined value 602. In particular, the magnitude of first predetermined value 601 may be greater than the magnitude of second predetermined value 602. For example, in one embodiment, first predetermined value 601 can be approximately 30 rpm. Likewise, in one embodiment, second predetermined value 602 can be approximately 10 rpm. In other embodiments, however, first predetermined value 601 and second predetermined value 602 can have any other values.

Furthermore, first predetermined value 601 and second predetermined value 602 can be selected in any manner. In some cases, first predetermined value 601 and second predetermined value 602 can be data settings that are determined during manufacturing according to various vehicle characteristics. For example, in one embodiment, first predetermined value 601 can be determined by testing one or more vehicles to determine the speed difference value that corresponds to a fully disengaged clutch. In addition, in one embodiment, second predetermined value 602 can be determined by testing one or more vehicles to determine normal variations in the speed difference value that are associated with clutch slippage, errors in calculating mainshaft or engine speeds, as well as other operating parameters. Furthermore, second predetermined value 602 can be selected as a value just outside the range of normal variations or errors in the speed difference value. In other embodiments, first predetermined value 601 and/or second predetermined value 602 can be calculated values or values determined by simulating a motor vehicle.

In the current embodiment, between time T2 and time T4, ECU 120 may continuously monitor the current clutch position and store the current clutch position as a temporary touch point position. At time T4, however, ECU 120 determines that measured speed difference value 600 is greater than or equal to second predetermined value 602. In other words, measured speed difference value 600 is substantially larger than normal variations in the speed difference value that may occur due to clutch slippage or due to errors in calculating engine speed and/or mainshaft speed. Therefore, ECU 120 determines that the clutch has been disengaged and is no longer transferring significant torque.

At this point, ECU 120 may stop updating the temporary clutch position with the current clutch position, since the current clutch position is assumed to be beyond the touch point. In other words, the last update of the temporary clutch position occurs at time T3, which is the last time that measured speed difference value 600 is below second predetermined value 602.

Between time T4 and time T5, ECU 120 may no longer store the current clutch position, since measured speed difference value 600 is greater than second predetermined value 602 which indicates that there is no significant torque transfer between the engine shaft and the mainshaft of the transmission. In other words, the temporary clutch position is no longer updated with the current clutch position. Instead, the stored temporary clutch position between time T4 and T5 is equal to the value of clutch position at time T3.

Finally, at time T5, ECU 120 determines that measured speed difference value 600 is greater than or equal to first predetermined value 601, which indicates a fully disengaged position of the clutch. At this point, ECU 120 may set the touch point value equal to the temporary clutch point position, which is equal to the value of clutch position 600 at time T3. This touch point value is then used as the new calibrated touch point value for use in any further operations of motor vehicle 100 in which the touch point value is required.

Using the arrangement discussed here, the touch point value may not be calibrated unless a motor vehicle remains in a calibration mode while the clutch moves form an engaged position to a fully disengaged position. In particular, although ECU 120 stops storing a temporary clutch position after time T4, ECU 120 may continue to determine if the motor vehicle is in a calibration mode between time T4 and time T5. If the motor vehicle remains in the calibration mode until the clutch is fully disengaged at time T5, then ECU 120 may set the touch point value equal to the temporary clutch position. If, however, ECU 120 determines that the motor vehicle is not in a calibration mode between time T4 and time T5, ECU 120 may exit the routine for calibrating the touch point value. In other words, ECU 120 may not update the touch point value at time T5.

Although the current embodiment uses a speed difference value equal to the mainshaft speed minus the engine speed, in other embodiments, the speed difference value could be calculated in another manner. For example, in an alternative embodiment, the speed difference value could be calculated as the engine speed minus the mainshaft speed. In this alternative embodiment, the speed difference value may be a negative value as the engine speed decreases while the mainshaft speed remains relatively constant. It will be understood that the first predetermined value and the second predetermined value can be modified in a manner that is consistent with the above discussion. In some cases, the first predetermined value and/or the second predetermined value may be negative values. For example, in an embodiment where the speed difference value is a negative value, the first predetermine value may be also have a negative value. Also, the second predetermined value may have a positive value. In this case, the ECU may set the temporary clutch position equal to the current clutch position when the magnitude of the speed difference value is less than the second predetermined value. Furthermore, the ECU may set the touch point value equal to the temporary clutch position when the speed difference value is less than the first predetermined value. In another embodiment, the magnitude of the speed difference value can be compared with the first predetermined value and/or the second predetermined value.

In another embodiment, measured speed difference value may be compared with one or more ranges of speed difference values, rather than single predetermined values. For example, in an alternative embodiment, an ECU may be configured to store the current clutch position as a temporary clutch position whenever measured speed difference value 600 is within a first range 631. Likewise, the ECU may be configured to set the touch point value equal to the temporary clutch position whenever measured speed difference value 600 is in second range 632. Furthermore, whenever measured speed difference value 600 in third range 633, the ECU may not update the temporary clutch position or the touch point value.

It will be understood that in some embodiments the preceding steps for determining a touch point value may only be performed when a vehicle is operating in a calibration mode. In addition, in situations where one or more vehicle parameters indicate that a vehicle is not operating in a calibration mode, the preceding steps may be skipped until a later time when the vehicle is operating in a calibration mode. With this arrangement, a new calibrated touch point value may only be determined during the calibration mode to prevent inaccurate measurements that may occur during a non-calibration mode.

Figure 7:
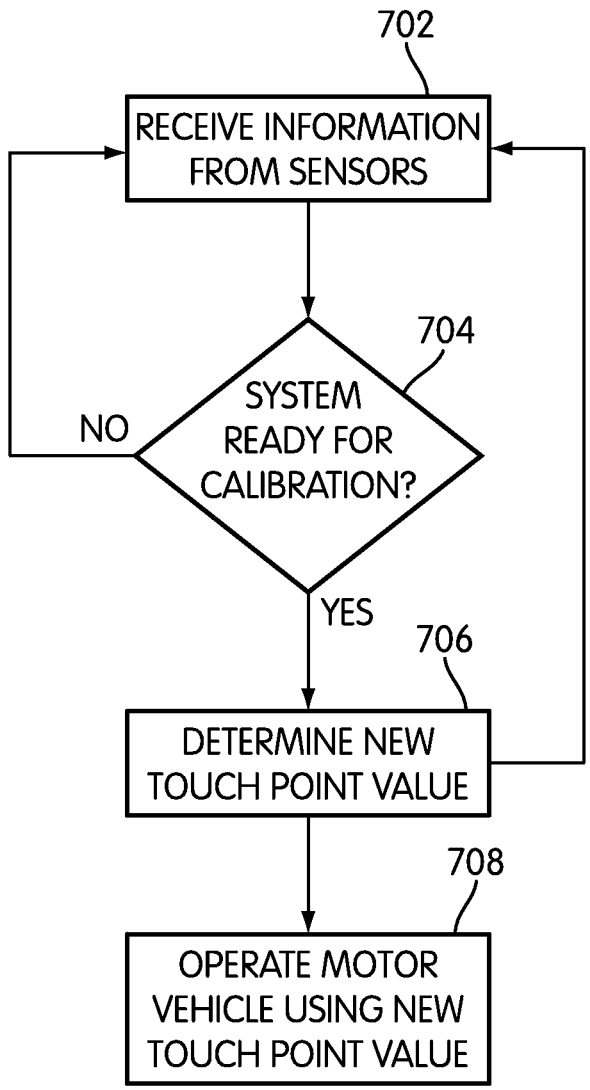
FIG. 7 is an embodiment of a process for calibrating a touch point value.

FIG. 7 illustrates an embodiment of a general process for calibrating the touch point value of a motor vehicle. In this embodiment, the following steps are preferably performed by ECU 120; however in some embodiments these steps may be performed by additional systems or devices associated with motor vehicle 100 and engine 102. In addition, it will be understood that in other embodiments one or more of the following steps may be optional.

During first step 702, ECU 120 may receive information from one or more sensors of motor vehicle 100. In some embodiments, ECU 120 may receive information from engine speed sensor 150, mainshaft speed sensor 152, output shaft speed sensor 153, neutral switch sensor 156 and clutch sensor 154. In addition, ECU 120 may determine information related to the operation of fuel injector set 170. At this point, ECU 120 may proceed to second step 704.

During second step 704, ECU 120 may determine if motor vehicle 100 is operating in a normal mode or a calibration mode. In other words, ECU 120 may determine if motor vehicle 100 is ready for calibration. If, during step 704, ECU 120 determines that motor vehicle 100 is ready for calibration, then ECU 120 may proceed to third step 706. During third step 706, ECU 120 may determine a new touch point value. Otherwise, ECU 120 may return back to first step 702 to receive additional information from one or more sensors. Finally, following third step 706, ECU 120 may proceed to fourth step 708. During fourth step 708, ECU 120 may use the new touch point value in any subsequent operations of the motor vehicle that require the use of a touch point value.

Figure 8:
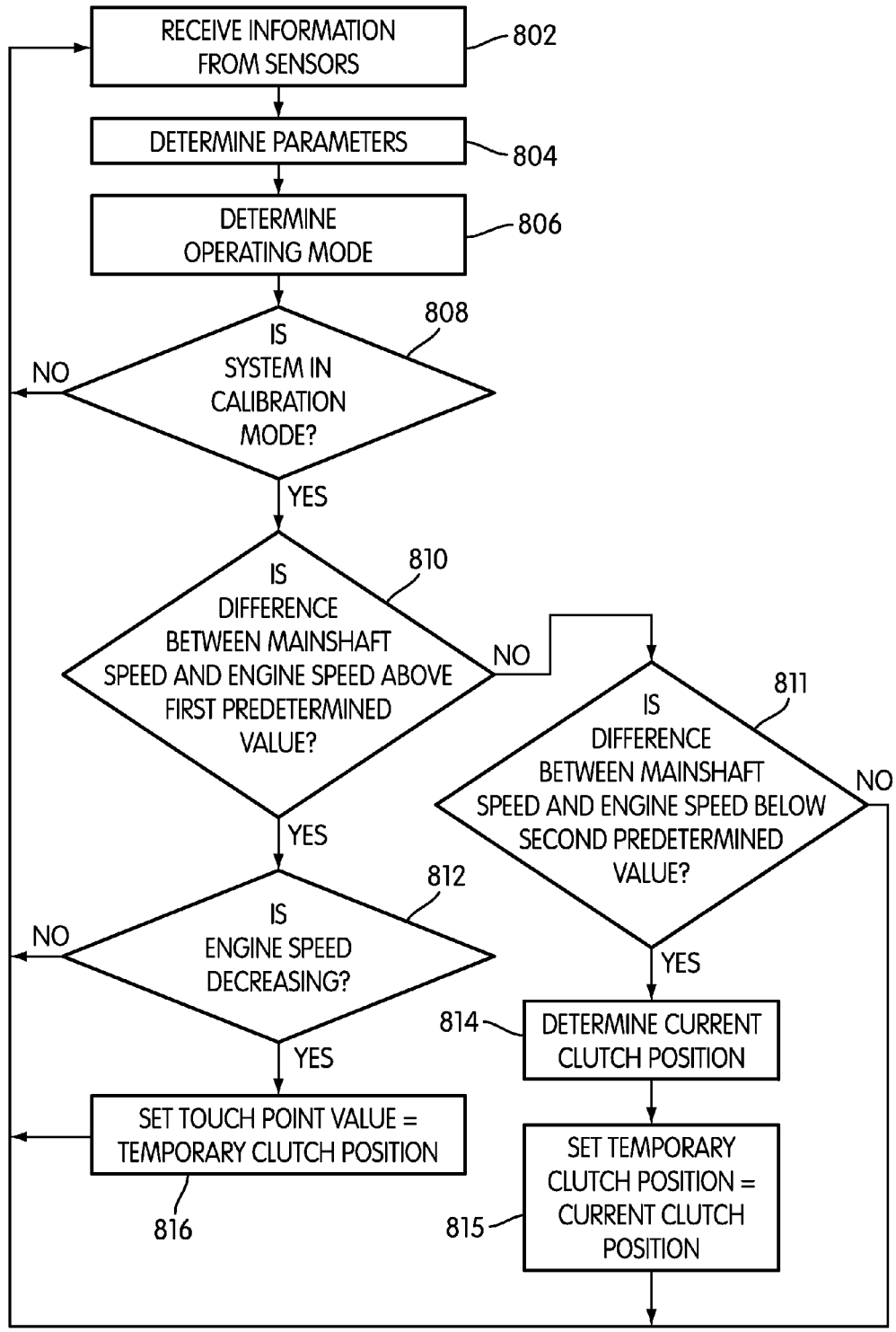
FIG. 8 is an embodiment of a process for calibrating a touch point value.

FIG. 8 illustrates an embodiment of a detailed process for calibrating the touch point value of motor vehicle 100. In this embodiment, the following steps are preferably performed by ECU 120; however in some embodiments these steps may be performed by additional systems or devices associated with motor vehicle 100 and engine 102. In addition, it will be understood that in other embodiments one or more of the following steps may be optional.

During step 802, ECU 120 may receive information from one or more sensors and/or systems of motor vehicle 100 as discussed above with respect to step 702. Next, ECU 120 may proceed to step 804. During step 804, ECU 120 may determine parameters related to touch point calibration. For example, ECU 120 can determine an engine speed, a mainshaft speed, an output shaft speed, a neutral switch value and a clutch position from engine speed sensor 150, mainshaft speed sensor 152, output shaft speed sensor 153, neutral switch sensor 156 and clutch sensor 154, respectively. Also, ECU 120 can determine a clutch velocity by calculating the change in clutch position as a function of time. In addition, ECU 120 can determine a fuel cut parameter related to the operation of fuel injector set 170.

Following step 804, ECU 120 may proceed to step 806. During step 806, ECU 120 may determine the operating mode of motor vehicle 100. Next, during step 808, ECU 120 determines if motor vehicle 100 is operating in a calibration mode according to step 806. If, during step 808, ECU 120 determines that motor vehicle 100 is not operating a calibration mode, ECU 120 returns to step 802. At this point, the system is prevented from determining a new touch point value, since the touch point value could be inaccurate when the vehicle is not operating in a calibration mode. Otherwise, ECU 120 proceeds to step 810.

During step 810, ECU 120 determines if the difference between the mainshaft speed and the engine speed, the speed difference value, is above a first predetermined value associated with a fully disengaged clutch data setting. In other words, referring back to FIG. 6, ECU 120 determines if measured speed difference value 600 is above first predetermined value 601. If the speed difference value is not above a first predetermined threshold, ECU 120 may proceed to step 811. Otherwise, ECU 120 may proceed to step 812.

During step 811, ECU 120 may determine if the difference between the mainshaft speed and the engine speed, the speed difference value, is below a second predetermined value associated with a normal variation in the speed difference value. In other words, referring back to FIG. 6, ECU 120 determines if measured speed difference value is below second predetermined value 602. If the difference between the mainshaft speed and the engine speed is not below the second predetermined value, ECU 120 may proceed to back to step 802. If the difference between the mainshaft speed and the engine speed is below the second predetermined value, ECU 120 may proceed to step 814.

During step 814, ECU 120 may determine the current clutch position. Next, during step 815, ECU 120 may set the temporary clutch position equal to the current clutch position. Following this, ECU 120 may proceed back to step 802.

If, during step 810, ECU 120 determines that the difference between the mainshaft speed and the engine speed is above the first predetermined value, then ECU 120 may proceed to step 812. During step 812, ECU 120 may determine if the engine speed is decreasing. If the engine speed is decreasing, ECU 120 may proceed to step 816. Otherwise, ECU 120 may proceed to step 802. During step 816, ECU 120 may set the touch point value equal to the temporary clutch position.

It will be understood that this process can occur multiple times to achieve a single calibration value. For example, in a situation where the motor vehicle is operating in a calibration mode and a driver depresses the clutch pedal, the touch point value will be continually updated through multiple iterations of the preceding process until the speed difference value is above the first predetermined value or until the motor vehicle is no longer operating in a calibration mode. In such cases, the value of the clutch position recorded just prior to the time at which the speed difference value is above the second predetermined value will be recorded as the current touch point value for use in any further operations of motor vehicle 100 in which the touch point value is required.

As previously discussed, and illustrated in FIGS. 4 and 5, a touch point calibration system may include provisions for determining if a vehicle is operating in a calibration mode before calibrating a touch point value. In particular, since the current method uses differences between the mainshaft speed of the transmission and the engine speed to determine a touch point value, a touch point calibration system may include provisions for preventing calibration when the mainshaft speed and/or the engine speed are varying in an uncontrolled manner. In addition, a touch point calibration system may include provisions for preventing calibration of a touch point value when the clutch position is varying in an uncontrolled manner. In an exemplary embodiment, a touch point calibration system can include a method of checking if a motor vehicle is operating in a calibration mode. In some cases, the method can include steps of monitoring various operating parameters that may influence the mainshaft speed, engine speed, clutch position and/or clutch velocity.

Figure 9:
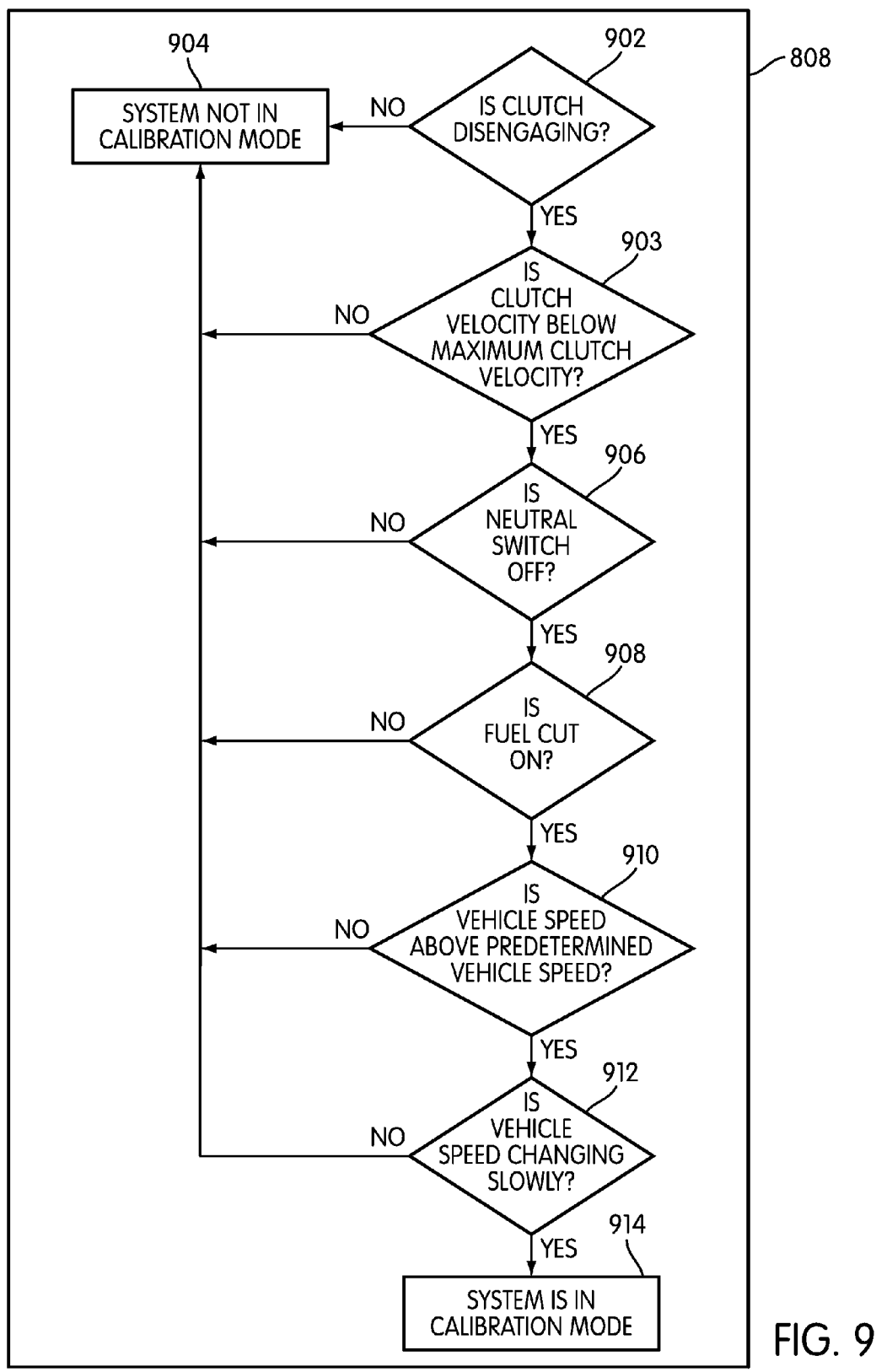
FIG. 9 is an embodiment of a detailed process for determining if a motor vehicle is operating in a calibration mode.

FIG. 9 illustrates an embodiment of a detailed process for determining if motor vehicle 100 is in a calibration mode. In this embodiment, the following steps are preferably performed by ECU 120; however in some embodiments these steps may be performed by additional systems or devices associated with motor vehicle 100 and engine 102. In addition, it will be understood that in other embodiments one or more of the following steps may be optional.

During step 902, ECU 120 determines if the clutch is disengaging. In other words, the ECU 120 determines of the clutch is moving from an engaged position to a disengaged position. If ECU 120 determines that the clutch is not being disengaged, then ECU 120 proceeds to step 904. If for example, the clutch position is not changing, or the clutch is moving from a disengaged position to an engaged position, the methods discussed above may not provide a reliable touch point value. Therefore, during step 904, ECU 120 determines that motor vehicle 100 is not operating in a calibration mode.

If, during step 902, ECU 120 determines that the clutch is disengaging, ECU 120 proceeds to step 903. During step 903, ECU 120 determines if the clutch velocity is below the maximum clutch velocity, as discussed in FIG. 5. If the clutch velocity is below the maximum clutch velocity, ECU 120 may proceed to step 906. Otherwise, ECU 120 may proceed to step 904.

During step 906, ECU 120 determines if the neutral switch of motor vehicle 100 is off. In other words, ECU 120 determines if motor vehicle 100 is in a neutral gear. If motor vehicle 100 is in a neutral gear, then the mainshaft speed may not change slowly and therefore ECU 120 proceeds to step 904. Otherwise, if motor vehicle 100 is not in a neutral gear the mainshaft speed may change slowly as the vehicle coasts and therefore ECU 120 proceeds to step 908.

During step 908, ECU 120 determines if fuel cut is on. If fuel cut is not on, the engine may receive fuel that can cause an increase in engine speed and therefore ECU 120 proceeds to step 904. Otherwise, if fuel cut is not on, ECU 120 proceeds to step 910.

During step 910, determines if the vehicle speed is above a predetermined vehicle speed. If so, ECU 120 proceeds to step 912. Otherwise, ECU 120 proceeds to step 904. During step 912, ECU 120 may determine if the vehicle speed is changing slowly. In some cases, ECU 120 may compare the change in vehicle speed with a predetermine change in vehicle speed, which may be a stored parameter. If the vehicle speed is changing slowly, ECU 120 may proceed to step 914, where ECU 120 determines that motor vehicle 100 is in a calibration mode. Otherwise, if during step 912 ECU 120 determines that the vehicle speed is increasing too rapidly, ECU 120 may proceed to step 904.

It will be understood that each of the steps discussed in the current embodiment for a method of determining if a motor vehicle is in a calibration mode may be optional. For example, in other embodiments, a touch point calibration system may determine if a motor vehicle is in a calibration mode using only some of the parameters discussed in the current embodiment. Furthermore, in other embodiments, a touch point calibration system may make use of additional parameters not discussed here for determining if a motor vehicle is operating in a calibration mode.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a manual transmission in a motor vehicle, comprising the steps of:
    sending information related to a clutch position from a clutch sensor to a control unit, the clutch position being a position of a clutch of the manual transmission of the motor vehicle located between a fully engaged position and a fully disengaged position, wherein the clutch is displaced linearly between the fully engaged position and the fully disengaged position;
    the control unit determining a clutch velocity according to the information related to the clutch position, the clutch velocity being determined based on a change in the clutch position measured over a time period;

the control unit comparing the clutch velocity with a predetermined maximum clutch velocity;

wherein the control unit allows a calibration mode of calibrating the touch point when the control unit determines that the clutch velocity is below the predetermined maximum clutch velocity, the calibration mode being used to determine a touch point value between the fully engaged position and the fully disengaged position for the clutch of the manual transmission;

wherein the control unit prevents the calibration mode when the control unit determines that the clutch velocity is greater than the predetermined maximum clutch velocity; and operating the manual transmission of the motor vehicle using the touch point value determined during the calibration mode.

2. The method according to claim 1, wherein the clutch sensor is associated with a clutch slave cylinder of the clutch.

3. The method according to claim 1, wherein the step of preventing the calibration mode via the control unit is followed by a step in which the control unit prevents the calibration mode when the engine is operated in a fuel cut mode.

4. The method according to claim 1, wherein the step of preventing the calibration mode via the control unit is followed by a step in which the control unit prevents the calibration mode when a transmission of the motor vehicle is in neutral.

5. The method according to claim 1, wherein the step of preventing the calibration mode via the control unit is followed by a step in which the control unit prevents the calibration mode when an engine speed of the motor vehicle is increasing.

6. The method according to claim 1, wherein the step of allowing the calibration mode via the control unit is followed by the steps of:

the control unit receiving information related to an engine speed from an engine speed sensor and receiving information related to a mainshaft speed of a transmission from a mainshaft speed sensor; and the control unit determining the touch point value using the clutch position, the mainshaft speed and the engine speed.

7. A method of calibrating a manual transmission in a motor vehicle, comprising the steps of:

providing a control unit which receives information related to a clutch position from a clutch sensor, the clutch position being a position of a clutch of the manual transmission of the motor vehicle located between a fully engaged position and a fully disengaged position, wherein the clutch is displaced linearly between the fully engaged position and the fully disengaged position;

the control unit determining an engine speed according to information received from an engine speed sensor and determining a mainshaft speed of a transmission according to information received from a mainshaft speed sensor;

the control unit calculating a speed difference value using the mainshaft speed and the engine speed;

the control unit determining whether the motor vehicle is operating in a normal mode or a calibration mode, wherein the determination between the normal mode and the calibration mode is based on at least one of the information related to the clutch position and the speed difference value;

the control unit determining a touch point value between the fully engaged position and the fully disengaged position for the clutch of the manual transmission using the clutch position and the speed difference value, when the control unit determines that the motor vehicle is operating in the calibration mode; and operating the manual transmission of the motor vehicle according to the determined touch point value.

8. The method according to claim 7, wherein the speed difference value is equal to the mainshaft speed minus the engine speed.

9. The method according to claim 8, wherein the step of determining the touch point value via the control unit further comprises the steps of:

the control unit retrieving a first predetermined value and a second predetermined value;

the control unit setting a temporary clutch position equal to the clutch position when the magnitude of the speed difference value is less than the second predetermined value; and the control unit setting the touch point value equal to the temporary clutch position when the speed difference value is greater than the first predetermined value.

10. The method according to claim 7, wherein the speed difference value is equal to the engine speed minus the mainshaft speed.

11. The method according to claim 10, wherein the step of determining the touch point value further comprises the steps of:

the control unit retrieving a first predetermined value and a second predetermined value;

the control unit setting a temporary clutch position equal to the clutch position when the magnitude of the speed difference value is less than the second predetermined value; and the control unit setting the touch point value equal to the temporary clutch position when the speed difference value is less than the first predetermined value.

12. The method according to claim 9, wherein the first predetermined value is associated with a fully disengaged position of the clutch position.

13. The method according to claim 9, wherein the second predetermined value is associated with a normal variation in the speed difference value.

14. The method according to claim 9, wherein the magnitude of the first predetermined value is greater than the magnitude of the second predetermined value.

15. A method of calibrating a manual transmission in a motor vehicle, comprising the steps of:

providing a control unit which receives information related to at least one operating parameter of the motor vehicle;

wherein the control unit further receives information related to a clutch position from a clutch sensor, the clutch position being a position of a clutch of the manual transmission of the motor vehicle located between a fully engaged position and a fully disengaged position, wherein the clutch is displaced linearly between the fully engaged position and the fully disengaged position;

the control unit determining an engine speed according to information received from an engine speed sensor and determining a mainshaft speed of a transmission according to information received from a mainshaft speed sensor;

the control unit calculating a speed difference value using the engine speed and the mainshaft speed;

the control unit checking if the motor vehicle is operating in a calibration mode using information related to the at least one operating parameter;

the control unit determining a touch point value between the fully engaged position and the fully disengaged position for the clutch of the manual transmission using the clutch position and the speed difference value when the control unit determines that the motor vehicle is operating in the calibration mode; and the control unit preventing determination of a new touch point value when the control unit determines that the motor vehicle is not operating in the calibration mode.

16. The method according to claim 15, wherein the at least one operating parameter is a clutch velocity, the clutch velocity being determined based on a change in the clutch position measured over a time period.

17. The method according to claim 15, wherein the at least one operating parameter is a fuel cut condition.

18. The method according to claim 15, wherein the at least one operating parameter is a vehicle speed.

19. The method according to claim 16, wherein the at least one operating parameter is a change in vehicle speed.

20. The method according to claim 16, wherein the clutch position is manually controlled by a driver using a clutch pedal associated with the manual transmission of the motor vehicle.

* * * * *